(12) United States Patent
Hsieh et al.

(10) Patent No.: US 11,527,949 B2
(45) Date of Patent: Dec. 13, 2022

(54) PROTECTION CIRCUIT AND OPERATION METHOD THEREOF

(71) Applicant: NUVOTON TECHNOLOGY CORPORATION, Hsinchu (TW)

(72) Inventors: Chung Ming Hsieh, Hsinchu (TW); Yeh-Tai Hung, Hsinchu (TW); Chung-He Li, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/369,595

(22) Filed: Jul. 7, 2021

(65) Prior Publication Data
US 2022/0149717 A1 May 12, 2022

(30) Foreign Application Priority Data
Nov. 10, 2020 (TW) .................................. 109139239

(51) Int. Cl.
*H02M 1/32* (2007.01)
*H02M 3/158* (2006.01)
*H02M 1/08* (2006.01)

(52) U.S. Cl.
CPC ............. *H02M 1/322* (2021.05); *H02M 1/08* (2013.01); *H02M 3/158* (2013.01)

(58) Field of Classification Search
CPC .......... H02M 1/322; H02M 1/08; H02M 1/32; H02M 1/325; H02M 3/158
See application file for complete search history.

(56) References Cited

U.S. PATENT DOCUMENTS

| | | | | |
|---|---|---|---|---|
| 2009/0309635 A1* | 12/2009 | Lee | ...................... | G11C 27/024 327/131 |
| 2011/0043140 A1* | 2/2011 | Shiu | ...................... | H05B 45/38 315/307 |
| 2013/0300385 A1* | 11/2013 | Li | ............................ | H02M 3/07 323/271 |
| 2015/0333623 A1* | 11/2015 | Chiu | ..................... | H03L 7/0895 327/536 |

* cited by examiner

*Primary Examiner* — Nguyen Tran
(74) *Attorney, Agent, or Firm* — Muncy, Geissler, Olds & Lowe, P.C.

(57) ABSTRACT

A protection circuit is adapted to a switching-capacitor regulation circuit having a capacitor. The protection circuit comprises a current source, first and second switch circuits, and a control unit. First, the control unit turns on the second switch circuit to make a top end and a bottom end of the capacitor, and control the first switch circuit to make the current source no connect the capacitor, and then set a voltage of the top and the bottom to be a first preset voltage. Next, the control unit turns off the second switch circuit to disconnect the top end and the bottom end, and turn on the first switch circuit to flow current from the bottom end of the capacitor. When a voltage difference between the top end and the bottom end is equal to a preset initial voltage, the control unit control the first switch circuit to disconnect the current source and the capacitor; next, the control unit controls current flow in or out from the top of the capacitor based on the voltage on the top of the capacitor.

10 Claims, 3 Drawing Sheets

The second switch circuit is controlled to be turned on to electrically connect the top end and bottom end of the capacitor of the switching-capacitor regulation circuit, and the first switch circuit is controlled to make the current source not electrically connected to the top end and bottom end of the capacitor. The voltage at the top end and bottom end of the capacitor is set to a predetermined high voltage. ~S71

The second switch circuit is controlled to turn off, to make the top end and bottom end of the capacitor not electrically connected. Then, the first switch circuit is controlled to make the current input end of the current source is electrically connected to the bottom end of the capacitor. ~S72

The first switch circuit is controlled to make the current source not electrically connected to the top end and bottom end of the capacitor. ~S73

The first switch circuit is controlled to selectively electrically connect one of the current input end and the current output end of the current source to the top end of the capacitor. ~S74

FIG. 3

PROTECTION CIRCUIT AND OPERATION METHOD THEREOF

FIELD OF TECHNOLOGY

The present disclosure relates to a protection circuit, and in particular, to a protection circuit suitable for a switching-capacitor regulation circuit having a capacitor.

BACKGROUND

In recent years, a switching-capacitor regulation circuit has the advantage of high conversion efficiency, so more and more chips use the switching-capacitor regulation circuit. When the switching-capacitor regulation circuit begins to operate, the capacitor voltage is required to have an initial voltage. For example, a 3-level buck converter requires the initial voltage across the fly capacitor to be half of the input voltage.

In order to reduce the on-resistance, most switching-capacitor regulation circuit, such as 3-level buck converters, use low-voltage components, but this design requires that the initial voltage must be accurate. Otherwise, the low-voltage components may be burned and the chip may be damaged. In order for the switching-capacitor regulation circuit to have an initial voltage when it is powered on, the switching-capacitor regulation circuit may have to provide a large current to charge the capacitor at the initial stage, but this operation is prone to inrush current and damage the chip.

In addition, in order to reduce costs, the transistor as a switching element in the switching-capacitor regulation circuit will be designed according to the cross voltage experienced during actual operation. Therefore, when the voltage of the capacitor in the switching-capacitor regulation circuit changes greatly, the transistor is likely to be burned out due to excessive cross voltage.

SUMMARY

One aspect of the present invention is to provide a protection circuit to solve the above-mentioned conventional technical problems.

In order to achieve the above objective, the present invention provides a protection circuit suitable for a switching-capacitor regulation circuit, which comprises a capacitor. The protection circuit comprises: a current source having a current input end and a current output end; a first switch circuit that electrically connects the current source to one of a top end and a bottom end of a capacitor; and a second switch circuit which is connected in parallel with the top end and bottom end of the capacitor; a control unit. In a first operation stage, the control unit controls the second switch circuit to conduct and controls the first switch circuit to make the current source is not electrically connected to the top end and the bottom end of the capacitor, to make the top end and the bottom end of the capacitor are electrically connected. And the control unit sets the voltage at the top end and the bottom end of the capacitor to be a first predetermined voltage. In a second operation stage, the control unit controls the second switch circuit to turn off, to make the top end and the bottom end of the capacitor are not electrically connected, and then controls the first switch circuit to turn on to make the current input end of the current source the bottom end of the capacitor is electrically connected. When the voltage difference between the top end and the bottom end of the capacitor is equal to a predetermined initial voltage, the control unit enters a third operation stage. In the third operation stage, the control unit controls the first switch circuit to make the current source is not electrically connected to the top end and the bottom end of the capacitor, and then controls the first switch circuit to electrically connect the top end of the capacitor to one of the current input end and the current output end of the current source, according to the voltage at the top end of the capacitor.

According to one embodiment of the present invention, the switching-capacitor regulation circuit receives an input voltage, and the preset initial voltage is half of the input voltage.

According to one embodiment of the present invention, in the first operation stage, when the input voltage is gradually rising, the control unit determines whether the voltage at the top end of the capacitor is higher than or equal to be a first preset voltage to determine whether to enter the second stage of operation.

According to one embodiment of the present invention, in the third operation stage, when the control unit determines that the voltage at the top end of the capacitor is higher than a first threshold voltage, the control unit controls the first switch circuit to electrically connect the current input end of the current source to the top end of the capacitor.

According to one embodiment of the present invention, in the third operation stage, when the control unit determines that the voltage at the top end of the capacitor is lower than a second threshold voltage, the control unit controls the second switch circuit to electrically connect the current output end of the current source to the top end of the capacitor.

According to one embodiment of the present invention, the first threshold voltage is higher than the second threshold voltage.

In order to achieve the above objects, the present invention further provides an operating method of a protection circuit, wherein the protection circuit is suitable for a switching-capacitor regulation circuit, the switching-capacitor regulation circuit comprises a capacitor, and the protection circuit comprises a current source, a first switch circuit and a second switch circuit. The operation method comprises the following steps: controlling the second switch circuit to be turned on, electrically connecting the top end and the bottom end of the capacitor, and controlling the first switch circuit to make the current source not electrically connected to the top end and the top end of the capacitor and set the voltages at the top end and the bottom end of the capacitor to be a predetermined voltage. When the voltages at the top end and the bottom end of the capacitor are equal to be the predetermined voltage, the second switch circuit is controlled to be turned off to make the top end and the bottom end of the capacitor not electrically connected, and the first switch circuit is controlled to make the current input end of the current source electrically connected to the bottom end of the capacitor. When the voltage difference between the top end and the bottom end of the capacitor is equal to a predetermined initial voltage, the first switch circuit is controlled to make the current source not electrically connected to the top end and the bottom end of the capacitor. The first switch circuit is controlled to electrically connect the top end of the capacitor to one of the current input end and the current output end of the current source according to the voltage at the top end of the capacitor.

According to one embodiment of the present invention, the step of controlling the first switch circuit to electrically connect the top end of the capacitor to one of the current input end and the current output end of the current source according to the voltage at the top end of the capacitor further comprises: when the voltage at the top end of the capacitor is higher than a first threshold voltage, the first switch circuit is controlled to electrically connect the current input end of the current source to the top end of the capacitor.

According to an embodiment, the step of controlling the first switch circuit to electrically connect the top end of the capacitor to one of the current input end and the current output end of the current source according to the voltage at the top end of the capacitor further comprises: the voltage at the top end of the capacitor is lower than a second threshold voltage, and the second switch circuit is controlled to electrically connect the current output end of the current source to the top end of the capacitor.

According to one embodiment of the present invention, the first threshold voltage is higher than the second threshold voltage.

BRIEF DESCRIPTION OF THE DRAWINGS

FIG. 3 is a flowchart of a method for operating a protection circuit according to one embodiment of the present invention.

DETAILED DESCRIPTION

The following will describe the implementation of the present invention in detail with the drawings and embodiments, so as to fully understand and implement the implementation process of how the present invention uses technical means to solve technical problems and achieve technical effects.

Figure 1:
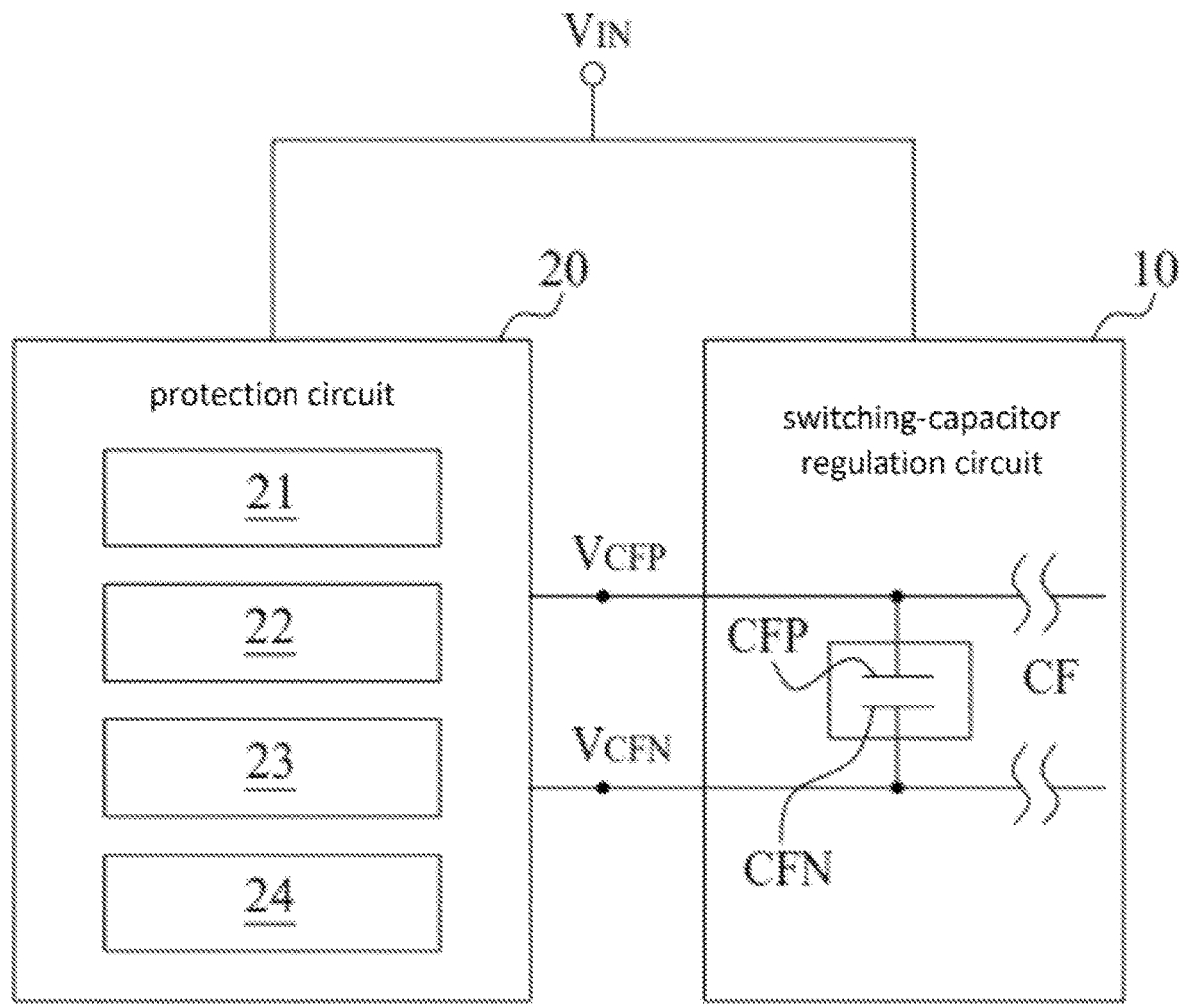
FIG. 1 is a block diagram of a protection circuit of the present invention.

Please refer to FIG. 1, which is a block diagram of a protection circuit of the present invention. As shown in FIG. 1, the protection circuit of the present invention is suitable for a switching-capacitor regulation circuit 10, such as a 3-level buck converter. The switching-capacitor regulation circuit 10 comprises a capacitor CF, and the protection circuit is used to initialize a voltage difference between a top end CFP and a bottom end CFN of the capacitor CF to a predetermined initial voltage, and to control the voltage difference between a top end CFP and a bottom end CFN of the capacitor CF during operation. The predetermined initial voltage is, for example, half of the input voltage or the supply voltage. The protection circuit may include a current source 21, a first switch circuit 22, a second switch circuit 23, and a control unit 24.

The first switch circuit 22 is used for electrically connecting the current source 21 to one of the top end CFP and the bottom end CFN of the capacitor CF. In one embodiment, the first switch circuit 22 comprises at least a plurality of switches. The second switch circuit 23 is connected in parallel with the top end CFP and the bottom end CFN of the capacitor CF. The detailed connection and operation methods will be described in subsequent paragraphs.

The control unit 24 has at least three operation stages, including a first operation stage, a second operation stage, and a third operation stage. In the first operation stage, the control unit 24 controls the second switch circuit 23 to conduct to make the top end CFP and the bottom end CFN of the capacitor CF are electrically connected; and the control unit 24 controls the first switch circuit 22 to make the current source 21 is not electrically connected to the top end CFP and bottom end CFN of the capacitor CF, whereby the control unit 24 sets the voltage at the top end CFP and the bottom end CFN of the capacitor CF to be a first predetermined voltage. Since the top end CFP and the bottom end CFN are electrically connected, other components of the protection circuit 20 cannot know the existence of the capacitor CF, which means that the protection circuit 20 can quickly change the voltage at the top end CFP and the bottom end CFN without affected by the capacitor CF. For example, the protection circuit 20 may increase the voltage at the top end CFP and the bottom end CFN at a speed of 3.6V/$\mu$s. Further, there is no need to use a large current to charge the capacitor CF during increasing the voltage, thereby avoiding inrush current.

In the second operation stage, the control unit 24 controls the second switch circuit 23 to turn off, to make the top end CFP and the bottom end CFN of the capacitor CF are not electrically connected, and controls the first switch circuit 22 to turn on to make the current input end of the current source 21 electrically connected to the bottom end CFN of the capacitor CF. Thereby, a current flowing from the bottom end CFN of the capacitor CF is generated until the voltage difference between the top end CFP and the bottom end CFN of the capacitor CF is equal to the predetermined initial voltage.

When current flows from the bottom end CFN of the capacitor CF, the voltage of the bottom end CFN of the capacitor CF will gradually drop. In addition, when current flows from the bottom end CFN of the capacitor CF, as long as current flows in the top end CFP of the capacitor CF, the voltage at the top end CFP of the capacitor CF can be maintained at a first predetermined voltage in the first operation stage. In the second operation stage, the voltage at the top end CFP of the capacitor CF is maintained at a first predetermined voltage in the first operation stage, and the voltage of the bottom end CFN of the capacitor CF will gradually decrease. When the voltage difference between the top end CFP and the bottom end CFN of the capacitor CF is equal to the predetermined initial voltage, the control unit 24 enters the third operation stage.

In the third operation stage, the control unit 24 controls the first switch circuit 22 to make the current source is not electrically connected to the top end CFP and the bottom end CFN of the capacitor CF. The switching-capacitor regulation circuit 10 may be operated when the cross voltage of the capacitor CF is the preset initial voltage. For example, when the voltage of the bottom end CFN of the capacitor CF drops to a predetermined low voltage, such as 0V, the voltage difference between the top end CFP and the bottom end CFN of the capacitor CF is equal to the predetermined initial voltage. (which is the difference between the predetermined high voltage and the predetermined low voltage) Then, the switching-capacitor regulation circuit 10 may begin to operate. Therefore, the control unit 24 controls the first switch circuit 22 to turn off the electrical connection between the current input end of the current source 21 and the bottom end CFN of the capacitor CF to make the voltage difference between the top end CFP and the bottom end CFN of the capacitor CF be the predetermined initial voltage.

According to the above content, the protection circuit of the present invention may quickly increase the voltage at the top end CFP of the capacitor CF, and there is no need to use a large current to charge the capacitor CF during increasing the voltage, thereby avoiding the generation of inrush current and achieving the effect of protection the circuit.

Next, the control unit 24 controls the first switch circuit 22 to electrically connect the top end CFP of the capacitor CF to one of the current input end and the current output end of the current source 21 according to the voltage $V_{CFP}$ at the top end CFP of the capacitor CF. For example, in the case that the bottom end CFN of the capacitor CF is grounded, when the voltage VCFP is higher than the first threshold voltage, the control unit 24 electrically connects the current input end of the current source 21 to the top end CFP of the capacitor CF, to make the voltage $V_{CFP}$ drop. When the voltage VCFP is lower than the second threshold voltage, the control unit 24 electrically connects the current output end of the current source 21 to the top end CFP of the capacitor CF, to make the voltage VCFP rise. Thereby, the voltage difference between the top end CFP and the bottom end CFN of the capacitor CF is maintained at the predetermined initial voltage to protect the low-voltage components connected to the capacitor CF.

Figure 2:
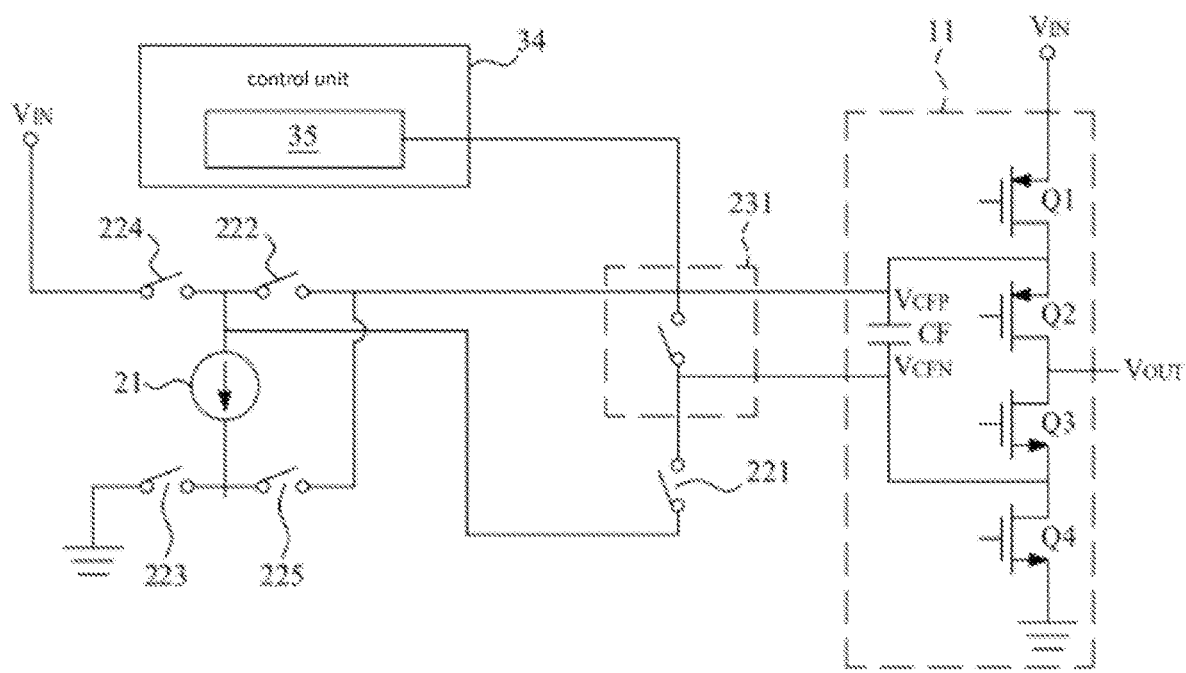
FIG. 2 is a block diagram of a protection circuit according to one embodiment of the present invention.

Please refer to FIG. 2, which is a block diagram of an embodiment of a protection circuit of the present invention. As shown in the embodiment in FIG. 2, the protection circuit may include a current source 21, switches 221 to 225, switch 231, and a control unit 34. In this embodiment, the protection circuit is applied to a third-order buck converter 11. The third-order buck converter 11 comprises transistors Q1 to Q4 and a capacitor CF, wherein the transistors Q1 to Q4 are serially connected in sequence, the source of the transistor Q1 receives the supply voltage $V_{IN}$, and the source of the transistor Q4 is grounded. The gates of transistors Q1~Q4 respectively receive control signals so as to enter on state or off state. The top end CFP and bottom end CFN of the capacitor CF are respectively coupled to the drain of the transistor Q1 and the drain of the transistor Q4. The transistors Q1 to Q4 are implemented by low-voltage components. The switches 221 to 225 implement the first switch circuit 22 shown in FIG. 1, and the switch 231 implements the second switch circuit 23 shown in FIG. 1.

The switch 231 is connected in parallel with the top end CFP and the bottom end CFN of the capacitor CF. The switch 221 is connected between the current input end of the current source 21 and the switch 231. One end of the switch 224 is connected to the current input end of the current source 21, and the other end receives the supply voltage $V_{IN}$. One end of the switch 223 is connected to the current output end of the current source 21, and the other end is grounded. The switch 222 is connected between the top end CFP of the capacitor CF and the current input end of the current source 21. One end of the switch 225 is connected to the current output end of the current source 21, and the other end is connected to the top end CFP of the capacitor CF.

The control unit 34 can be used to control the switches 221 to 225 and the switch 231 to be on or off. In this embodiment, the control unit 34 further includes a voltage setting unit 35.

In the first operation stage, the control unit 34 controls the switch 231 to turn on, so as to make the top end CFP and the bottom end CFN of the capacitor CF electrically connected to each other. The voltage setting unit 35 is used to set the voltage at the top end CFP and the bottom end CFN of the capacitor CF as the predetermined high voltage. In addition, the control unit 34 controls the switches 221, 222, and 225 to turn off, so as to make the current source 21 is not electrically connected to the top end CFP and the bottom end CFN of the capacitor CF.

When the system is just powered on, the supply voltage $V_{IN}$ is relatively unstable or takes a while to rise to a predetermined value, and the predetermined high voltage will be affected by the stability of the supply voltage $V_{IN}$. Therefore, the control unit 34 may further determine whether the voltage at the top end CFP of the capacitor CF is higher than or equal to the predetermined high voltage, and if so, the control unit 34 enters the second operation stage.

In the second operation stage, the control unit 34 controls the switch 231 to turn off, so as to make the top end CFP and bottom end CFN of the capacitor CF not electrically connected. At this time, the voltage $V_{CFP}$ at the top end CFP and the voltage $V_{CFP}$ of the bottom end CFN are both the predetermined high voltage. The control unit 34 controls the switches 221 and 223 to turn on and controls the switches 222, 224 and 225 to turn off, so as to make the bottom end CFN of the capacitor CF electrically connected to the current input end of the current source 21. Thereby, the current flows out from the bottom end CFN of the capacitor CF, then the voltage $V_{CFP}$ at the bottom end CFN of the capacitor CF drops, and the voltage difference between the top end CFP and the bottom end CFN of the capacitor CF increases. When a voltage difference between the top end CFP and the bottom end CFN of the capacitor CF is equal to the predetermined initial voltage, the control unit 34 enters the third operation stage.

In the third operation stage, the control unit 34 first controls the switches 231, 221 to 225 to turn off, and enables the third-order buck converter 11 to begin operating. When the third-order buck converter 11 is operating, the control unit 34 controls the switches 221~225 according to the voltage $V_{CFP}$ at the top end CFP of the capacitor CF, to make the top end CFP electrically connected to one of the current input end and the current output end of the current source 21, so as to maintain the cross voltage between the top end CFP and the bottom end CFN of the capacitor CF the bottom end CFN. It prevents the low-voltage components of the third-order buck converter 11 (for example, transistors Q1 to Q4) from being damaged due to the unstable cross voltage of the capacitor CF.

In the case that the transistor Q4 is turned on and the bottom end CFN of the capacitor CF is grounded, when the voltage $V_{CFP}$ is higher than the first threshold voltage, the control unit 34 turns on the switches 222 and 223 and turns off the switches 221, 224 and 225. The current input end of the current source 21 is electrically connected to the top end CFP of the capacitor CF, and then the voltage $V_{CFP}$ drops. When the voltage $V_{CFP}$ is lower than the second threshold voltage, the control unit 34 electrically connects the current output end of the current source 21 to the top end CFP of the capacitor CF, and then the voltage $V_{CFP}$ increases. Therefore, the voltage difference between the top end CFP and the bottom end CFN of the capacitor CF may be maintained at the predetermined initial voltage to protect the switching element connected to the capacitor CF. The first threshold voltage is higher than the second threshold voltage.

In one embodiment, when the comparator is used for the above-mentioned voltage comparison, the first threshold voltage may be the predetermined initial voltage plus the hysteresis voltage of the comparator, and the second threshold voltage may be the predetermined initial voltage minus the hysteresis voltage of the comparator.

Please refer to FIG. 3, which is a flowchart of a method for operating a protection circuit according to one embodiment of the present invention. This operation method may be applied to the protection circuit shown in FIG. 1 and include steps S71 to S74.

In step S71, the second switch circuit is controlled to be turned on to electrically connect the top end and bottom end of the capacitor of the switching-capacitor regulation circuit, and the first switch circuit is controlled to make the current source not electrically connected to the top end and bottom end of the capacitor. The voltage at the top end and bottom end of the capacitor is set to a predetermined high voltage.

Since the top end and bottom end of the capacitor are electrically connected, the external components cannot know the existence of the capacitor of the switching-capacitor regulation circuit. Therefore, the voltage at the top end and bottom end can be set to quickly rise without affecting of the capacitance CF. Moreover, there is no need to use a large current to charge the capacitor during increasing the voltage. Thereby, the generation of inrush current is prevented.

In step S72, when the voltage at the top end and bottom end of the capacitor is equal to a first preset voltage, the second switch circuit is controlled to turn off, to make the top end and bottom end of the capacitor not electrically connected. Then, the first switch circuit is controlled to make the current input end of the current source is electrically connected to the bottom end of the capacitor.

In step S73, when a voltage difference between the top end and bottom end of the capacitor is equal to a predetermined initial voltage, the first switch circuit is controlled to make the current source not electrically connected to the top end and bottom end of the capacitor. At the same time, the switching-capacitor regulation circuit may begin to operate.

In step S74, according to the voltage at the top end of the capacitor, the first switch circuit is controlled to electrically connect one of the current input end and the current output end of the current source to the top end of the capacitor. For example, in the case that the bottom end of the capacitor is grounded, when the voltage at the top end of the capacitor is higher than the first threshold voltage, the control unit electrically connects the current input end of the current source to the top end of the capacitor, and then the voltage drops. When the voltage is lower than the second threshold voltage, the control unit electrically connects the current output end of the current source to the top end of the capacitor to increase the voltage. Therefore, the voltage difference between the top end and bottom end of the capacitor is maintained at the predetermined initial voltage to protect low-voltage components connected to capacitor CF.

Although the present invention is disclosed in the foregoing embodiments as above, it is not intended to limit the present invention. Anyone familiar with similar art can make some changes and modifications without departing from the spirit and scope of the present invention. Therefore, the scope of patent protection of the present invention shall be determined by the scope of the patent application attached to this specification.

What is claimed is:

1. A protection circuit suitable for a switching-capacitor regulation circuit, wherein the switching-capacitor regulation circuit comprises a capacitor, and the protection circuit comprises:
   a current source having a current input end and a current output end;
   a first switch circuit, electrically connecting the current source to one of a top end and a bottom end of the capacitor;
   a second switch circuit, connected to the top end and the bottom end of the capacitor in parallel; and
   a control unit;
   wherein when the control unit is operated in a first operation stage, the control unit controls the second switch circuit to turn on, and controls the first switch circuit to make the current source be not electrically connected to both of the top end and the bottom end of the capacitor, so that the top end and the bottom end of the capacitor are electrically connected to each other, and the control unit sets voltages of the top end and the bottom end of the capacitor to be a first preset voltage;
   wherein when the control unit is operated in a second operation stage, the control unit controls the second switch circuit to turn off to make the top end and the bottom end of the capacitor be not electrically connected to each other, and controls the first switch circuit to turn on to make the current input end of the current source be electrically connected to the bottom end of the capacitor; and when a voltage difference between the top end and the bottom end of the capacitor is equal to a preset initial voltage, the control unit enters a third operation stage; and
   wherein when the control unit is operated in the third operation stage, the control unit controls the first switch circuit to make the current source be not electrically connected to both of the top end and the bottom end of the capacitor, and then according to the voltage at the top end of the capacitor, the control unit controls the first switch circuit to selectively make one of the current input end and the current output end of the current source be electrically connected to the top end of the capacitor.

2. The protection circuit of claim 1, wherein the switching-capacitor regulation circuit receives an input voltage, and the preset initial voltage is half of the input voltage.

3. The protection circuit of claim 2, wherein when the control unit is operated in the first operation stage and the input voltage is gradually rising, the control unit determines whether the voltage at the top end of the capacitor is higher than or equal to a first preset voltage, so as to determine whether to enter the second operation stage.

4. The protection circuit of claim 1, wherein when the control unit is operated in the third operation stage and the control unit determines that the voltage at the top end of the capacitor is higher than a first threshold voltage, the control unit controls the first switch circuit to make the current input end of the current source be electrically connected to the top end of the capacitor.

5. The protection circuit of claim 4, wherein when the control unit is operated in the third operation stage and the control unit determines that the voltage at the top end of the capacitor is lower than a second threshold voltage, the control unit controls the first switch circuit to make the current input end of the current source be electrically connected to the top end of the capacitor.

6. The protection circuit of claim 5, wherein the first threshold voltage is higher than the second threshold voltage.

7. An operation method of a protection circuit, wherein the protection circuit is configured to be used for a switching-capacitor regulation circuit, the switching-capacitor regulation circuit comprises a capacitor, the protection circuit comprises a current source and a first switch circuit and a second switch circuit, and the operation method comprises:
   controlling the second switch circuit to turn on, so as to make a top end and a bottom end of the capacitor be electrically connected to each other, and controlling the first switch circuit to make the current source be not electrically connected to the top end and the bottom end of the capacitor, and setting voltages at the top end and the bottom end of the capacitor to be a first preset voltage;

when the voltages at the top end and bottom end of the capacitor are equal to the first preset voltage, controlling the second switch circuit to turn off to make the top end and the bottom end of the capacitor be not electrically connected to each other, and controlling the first switch circuit to make a current input end of the current source be electrically connected to the bottom end of the capacitor;

when a voltage difference between the top end and the bottom end of the capacitor is equal to a preset initial voltage, controlling the first switch circuit to make the current source be not electrically connected to the top end and the bottom end of the capacitor; and according to the voltage at the top end of the capacitor, controlling the first switch circuit to electrically connect one of the current input end and a current output end of the current source to the top end of the capacitor.

8. The operation method of claim 7, wherein the step of controlling the first switch circuit to electrically connect one of the current input end and a current output end of the current source to the top end of the capacitor according to the voltage at the top end of the capacitor further comprises:

when the voltage at the top end of the capacitor is higher than a first threshold voltage, controlling the first switch circuit to electrically connect the current input end of the current source to the top end of the capacitor.

9. The operation method of claim 8, wherein the step of controlling the first switch circuit to electrically connect one of the current input end and the current output end of the current source to the top end of the capacitor according to the voltage at the top end of the capacitor further comprises:

when the voltage at the top end of the capacitor is lower than a second threshold voltage, controlling the first switch circuit to electrically connect the current output end of the current source to the top end of the capacitor.

10. The operation method of claim 9, wherein the first threshold voltage is higher than the second threshold voltage.

* * * * *